(12) United States Patent
Castro

(10) Patent No.: US 8,876,580 B2
(45) Date of Patent: Nov. 4, 2014

(54) UNIFORM FLOW SUPPLY DUCT AND ASSOCIATED METHOD OF SIZING RESTRICTOR PLATES

(75) Inventor: Steven A. Castro, Bothell, WA (US)

(73) Assignee: The Boeing Company, Chicago, IL (US)

( * ) Notice: Subject to any disclaimer, the term of this patent is extended or adjusted under 35 U.S.C. 154(b) by 2006 days.

(21) Appl. No.: 11/612,219

(22) Filed: Dec. 18, 2006

(65) Prior Publication Data

US 2008/0142636 A1    Jun. 19, 2008

(51) Int. Cl.
B64D 13/00    (2006.01)

(52) U.S. Cl.
USPC .......................................................... 454/76

(58) Field of Classification Search
USPC ............... 454/70, 71, 76, 302, 306, 296, 284, 454/292, 137, 136; 244/118.5; 138/40, 45, 138/42, 44
See application file for complete search history.

(56) References Cited

U.S. PATENT DOCUMENTS

| | | | | | |
|---|---|---|---|---|---|
| 2,180,945 | A | * | 11/1939 | Morey | 454/297 |
| 3,130,541 | A | * | 4/1964 | Babbit | 138/40 |
| 3,157,105 | A | * | 11/1964 | Tamm et al. | 454/192 |
| 3,319,558 | A | * | 5/1967 | Bodian | 454/296 |
| 3,643,585 | A | * | 2/1972 | Barteleit et al. | 454/309 |
| 3,673,945 | A | * | 7/1972 | Rachlin et al. | 454/298 |
| 3,699,872 | A | * | 10/1972 | Kruger | 454/303 |
| 3,744,724 | A | * | 7/1973 | Caille | 239/553.5 |
| 3,918,354 | A | * | 11/1975 | Lambert | 454/304 |
| 4,126,268 | A | * | 11/1978 | Vitale | 236/38 |
| 4,426,918 | A | * | 1/1984 | Lambert | 454/298 |
| 4,811,575 | A | * | 3/1989 | Currier et al. | 454/333 |
| 5,024,454 | A | * | 6/1991 | McGilp et al. | 277/616 |
| 6,113,485 | A | * | 9/2000 | Marquis et al. | 454/184 |
| 6,116,095 | A | * | 9/2000 | Radle | 73/861.01 |
| 6,386,970 | B1 | * | 5/2002 | Vernier et al. | 454/304 |
| 6,752,712 | B1 | * | 6/2004 | Short et al. | 454/76 |
| 6,953,396 | B2 | * | 10/2005 | Paschke et al. | 454/306 |

OTHER PUBLICATIONS

Arunkumar G. Jhaveri, The Effect of Subsonic Airflow on Acoustic Behavior of Different Geometrical COnfigurations for Restrictors in teh 747 Air COnditioning Distribution Ducts, 6th Internation Congress on Acoustics, Aug. 21-28, 1968.*

* cited by examiner

Primary Examiner — Steven B McAllister
Assistant Examiner — Brittany Towns
(74) Attorney, Agent, or Firm — Alston & Bird LLP

(57) ABSTRACT

A supply duct is provided for supplying a gaseous fluid at a constant flow rate per unit length of the duct. The supply duct includes a main compartment, at least one nozzle disposed in the main compartment, and a plurality of restrictors extending from an inner wall of the main compartment. The main compartment of the supply duct has a generally constant cross-section. Each nozzle in the main compartment defines an outlet to allow a gaseous fluid to flow out from the main compartment. Each restrictor is configured to produce a flow rate through the nozzle at the first end of the main compartment that is substantially equal to the flow rate through the nozzle at the second end of the main compartment. The restrictor may be, for example, a restrictor plate. A method of sizing restrictor plates is also provided.

18 Claims, 4 Drawing Sheets

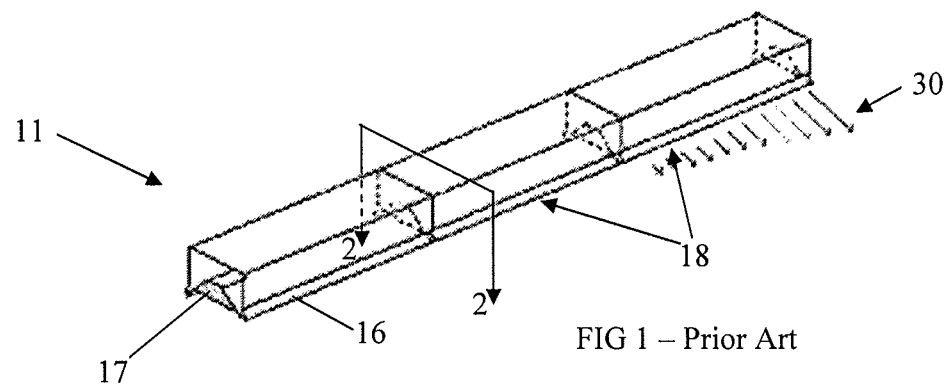
FIG 1 – Prior Art
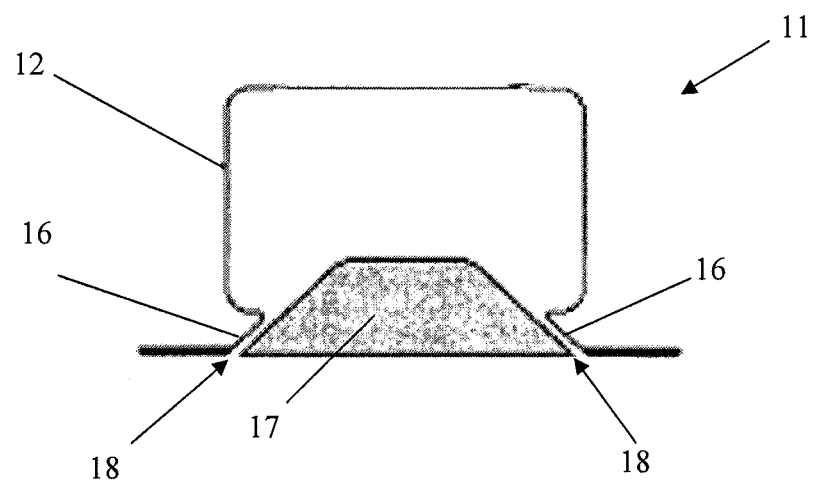
FIG 2 – Prior Art

UNIFORM FLOW SUPPLY DUCT AND ASSOCIATED METHOD OF SIZING RESTRICTOR PLATES

BACKGROUND OF THE INVENTION

Embodiments of the present invention relate to a duct for supplying and distributing a gaseous fluid. More specifically, embodiments of the invention relate to a duct for supplying a gaseous fluid, such as to an aircraft interior, at a constant flow rate per unit of length of the duct.

In commercial cargo and commuter aircraft as well as other types of vehicles and structures, ventilation of the cargo and passenger compartments is important. These ventilation systems generally provide breathable air to clear contaminants from the interior compartments, to control humidity and temperature, and to pressurize the compartments for the health and comfort of the occupants.

Ventilation systems typically include a supply duct that extends the length of the cargo and/or passenger compartments. The air duct is generally connected to an air source and typically has one or more nozzles for distributing the air throughout the interior compartments. A typical aircraft supply duct 11 of the prior art is shown in FIG. 1, with a cross-section of the prior art supply duct 11 shown in FIG. 2.

One challenge that designers of ventilation systems have faced is non-uniform distribution of the air along the supply duct. In general, this issue is caused by a rise in the static pressure at locations within the duct that are farther away from the air source, such as near an end of the duct farthest from the air source. Longer supply ducts, such as those in longer models of aircraft, are more susceptible to this effect, known as the manifold effect.

At a location within the supply duct near the air source, the air has a high velocity as it flows through the duct, resulting in a relatively low static pressure within the duct. However, as air exits the supply duct through the nozzle outlets, the volume of air inside the duct decreases, thereby reducing the velocity of the air flow inside the duct and causing a rise in the static pressure. This rise in static pressure in turn creates a larger pressure gradient across the outlet of the nozzle, resulting in more air flow out of the nozzle than at points upstream, as shown in FIG. 1. This effect is more pronounced at points along the supply duct that are farther from the air source.

A uniform air flow rate along the supply duct is important for even distribution of air through the interior compartment. Several solutions have been proposed to address this issue, but each proposed solution has significant drawbacks.

One method of providing uniform air flow is to shorten the supply duct, thereby reducing the resulting rise in static pressure at the downstream portions of the duct. The shorter duct, however, requires more risers, or ducts that connect to the main air source, and flow balance orifices. These additional components and design considerations involve increased costs that are undesirable.

Another method that has been proposed is to reduce the size of the nozzle openings and to increase the static pressure in the duct. The disadvantage of this method is the resulting need for increased fan power to create the higher static pressure. In addition to increased costs, the higher static pressure generated within the duct causes a larger pressure gradient across the nozzle outlet that is accompanied by more noise as air flows out of the nozzle. Such an increase in noise is disturbing to occupants and is thus undesirable.

Yet another proposed solution is to taper the supply duct, such that the cross-sectional area of the duct is decreased in downstream duct sections that are farther from the air source. Although this approach may result in a reduced static pressure in downstream portions of the duct, a gradually tapered duct is rarely used due to the associated costs of manufacture and assembly. As an alternative, this method generally requires using a series of short sections of duct with steadily reducing constant diameters, resulting in a supply duct with a diameter that is gradually stepped down. This approach has its own drawbacks, however, as it involves the logistical complexity of manufacturing duct sections of various sizes, storing the different sections in inventory, and assembling the sections using the correct size of duct section at the appropriate locations and with the appropriate transitional connections.

Another method that has been proposed to produce a uniform flow rate along the duct is to use nozzles with varying orifice sizes. In downstream portions of the supply duct, farther from the air source, larger nozzle orifices would allow a greater volume of air to exit the supply duct, thereby reducing the static pressure within the duct and also reducing the velocity of the air as it flowed through the outlet. This method has practical disadvantages, however, as it once again requires non-uniform parts, which add to the cost and complexity of manufacture and construction.

Therefore, there is a need for a supply duct that provides a gaseous fluid at a constant flow rate per unit length of the duct and that uses uniform parts, is relatively simple to manufacture and assemble, and does not decrease the comfort or safety of the occupants.

BRIEF SUMMARY OF THE INVENTION

Embodiments of the present invention generally relate to a supply duct for supplying a gaseous fluid comprising a main compartment, at least one nozzle disposed in the main compartment, and a plurality of restrictors. The main compartment of the supply duct has a generally constant cross-section and is in fluid communication with a source of gaseous fluid. The main compartment further has a first end and a second end and defines a central axis between the two ends. By appropriately designing and/or positioning the restrictors within the main compartment, the supply duct can advantageously deliver a gaseous fluid at a flow rate that is substantially equal at both the first and second ends of the main compartment.

Each nozzle in the main compartment defines an outlet to allow a gaseous fluid to flow out from the main compartment. In some embodiments, the outlets defined by the nozzles generally extend the length of the main compartment.

The restrictors extend from an inner wall of the main compartment in the direction of the central axis of the main compartment. Each restrictor is configured to produce a flow rate through the nozzle at the first end of the main compartment that is substantially equal to the flow rate through the nozzle at the second end of the main compartment.

In some embodiments, the restrictors are configured such that the flow rate through the outlet is substantially constant per unit length of the nozzle. The restrictors may be plates, and the restrictors may all be substantially the same size. The restrictors may be distributed along the main compartment such that the restrictors are generally equidistant from one another. The restrictors may be configured to create a total pressure drop across the restrictors, from the source to an endpoint in the main compartment downstream of the source, that is substantially equal to the rise in static pressure from the source to the endpoint. The restrictors may also be configured such that a predetermined amount of pressure variation is produced within the main compartment.

The supply duct may be connected to the gaseous fluid source at a variety of locations along the duct. For example, the first end or the second end of the main compartment may be close to the source, such that the gaseous fluid must flow nearly the entire length of the duct to reach the opposite end. Likewise, the source may be located somewhere between the first end and the second end of the main compartment, such that the gaseous fluid flows out from the source to each of the first and second ends. In other embodiments, at least one end of the main compartment may be attached to an adjacent duct, such as one end of the main compartment of the adjacent duct, to form a longer supply duct.

The supply duct can be employed in various environments including, for example, in an aircraft. In this regard, an aircraft is provided in accordance with another embodiment of the present invention in which the aircraft comprises an aircraft body and a supply duct for supplying air to an interior portion of the aircraft body. The supply duct has a first end and a second end and includes a plurality of substantially similar duct sections. Each section comprises a main compartment, at least one nozzle extending between a first end of the section and a second end of the section, and at least one restrictor plate. The main compartment has a generally constant cross-section, includes an inner wall, and is in fluid communication with an air source. The first end and the second end of each section define a central axis, and each restrictor plate extends from the inner wall of the main compartment in the direction of the central axis. Furthermore, each nozzle defines an outlet to allow air to flow from the main compartment to the interior portion of the aircraft body.

The restrictor plates in the supply duct are substantially identical and are spaced equidistant from other restrictor plates. The restrictor plates are configured such that the air flow rate through the outlet close to the first end of the supply duct is substantially equal to the air flow rate through the outlet close to the second end of the supply duct.

The restrictor plate may be configured to generate a total pressure drop in each duct section that is generally equal to the rise in static pressure along the duct section. The restrictor plates may also be configured to allow a predetermined amount of pressure variation within each duct section and between duct sections. The restrictor plates may be spaced apart from each other by 20 to 30 inches.

In some embodiments, the aircraft may further comprise a connection between the inner wall of the main compartment and each restrictor plate. The connection may include either mechanical fasteners or adhesive, or both. The aircraft may also further comprise a connection between at least one end of each duct section and an end of an adjacent duct section. The connection between duct sections may be a bell and spigot connection.

The aircraft may further comprise an air source. In some embodiments, the air source may be located near one end of the supply duct. In other embodiments, the air source may be located between the two ends of the supply duct, and air may flow from the air source to each of the two ends.

Another embodiment of the present invention is directed to a method of sizing restrictor plates. The method includes determining a flat plate drag coefficient for a predetermined size of the restrictor plate, calculating a pressure drop across the restrictor plate, and determining the number of restrictor plates required to produce a total pressure drop that is substantially equal to the rise in static pressure.

The method may further comprise adjusting the predetermined size of the restrictor plates and the distance between adjacent restrictor plates such that the resulting flow rate out of the supply duct is generally constant per unit length of the supply duct. The method may also further comprise varying the location of the restrictor plates along a perimeter of a cross-section of the supply duct such that the determined distance between restrictor plates is unchanged to create a predetermined amount of pressure variation within the supply duct. In addition, the method may further comprise distributing the restrictor plates along the supply duct such that the distance between adjacent restrictor plates is substantially the same.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 is a perspective view of the supply duct of the prior art showing a non-uniform rate of flow out of the supply duct;

FIG. 2 is a cross-sectional view of the supply duct of the prior art;

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Embodiments of the present invention are directed to a supply duct 10 for supplying a gaseous fluid, such as air, to an environment at a generally constant flow rate per unit length of the supply duct 10. While the supply duct 10 will be generally described herein in conjunction with the supply of air to the various interior compartments of an aircraft, the supply duct 10 may also be employed in other applications including those involving the supply of air or other gaseous fluids to other types of vehicles or other structures. For example, the supply duct 10 may be used in mobile platforms such as trains, buses, and maritime vehicles, as well as in stationary systems such as building ventilation ducts.

Figure 3:
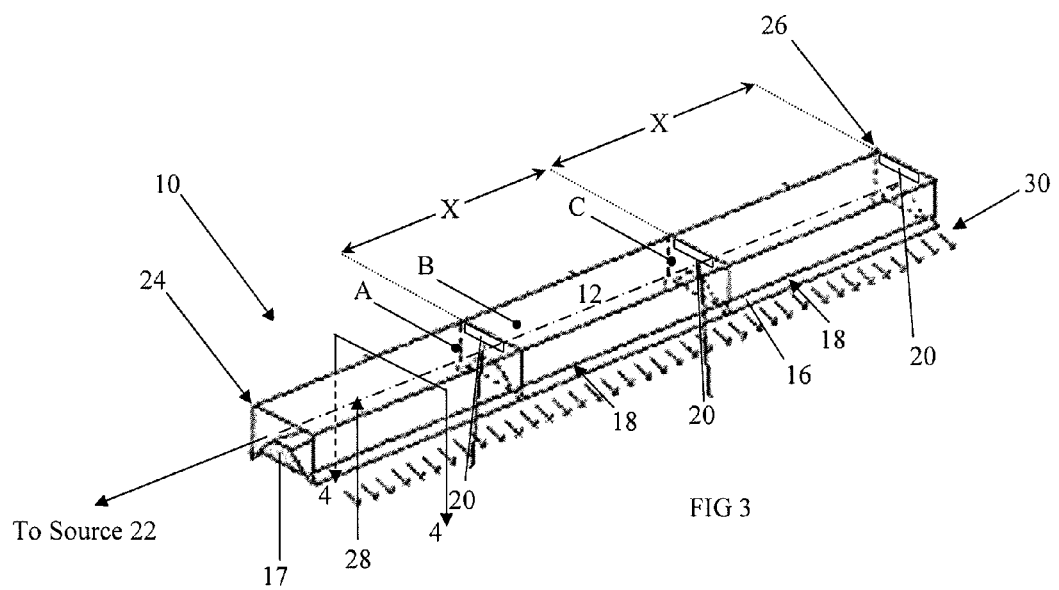
FIG. 3 is a perspective view of one embodiment of the supply duct of the present invention with restrictor plates illustrating a uniform rate of flow out of the supply duct.
Figure 4:
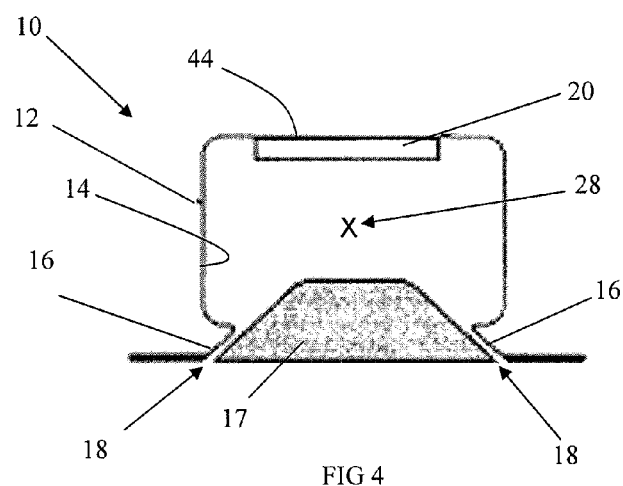
FIG. 4 is a cross-sectional view of one embodiment of the supply duct of the present invention showing a restrictor plate.

Referring to FIGS. 3 and 4, the supply duct 10 comprises a main compartment 12 having an inner wall 14, at least one nozzle 16 defining an outlet 18, and a plurality of restrictors. In an exemplary embodiment illustrated in the figures and described below, the restrictors are restrictor plates 20. However, other shapes and sizes of restrictors do not depart from the scope of this invention. For example, restrictors may be blocks, bars, or other protuberances of various shapes that restrict the flow of gaseous fluid through the main compartment 12. As such, although the following discussion is focused on restrictor plates, the discussion is equally applicable to other forms of restrictors.

In addition, the number of restrictors in each duct section may vary from one application to another, and there may be a non-uniform distribution of restrictors along the supply duct 10. For instance, there may be zero restrictors in one duct section and one or two restrictors in an adjacent section. In addition, the restrictors may not be uniform from section to section but can vary in size and/or location between sections. The restrictors may also be adjustable, such that the position of the restrictor along the supply duct 10, about the central axis, or relative to the plane of the inner wall 14 to which the restrictor is attached may be adjusted.

Figure 5:
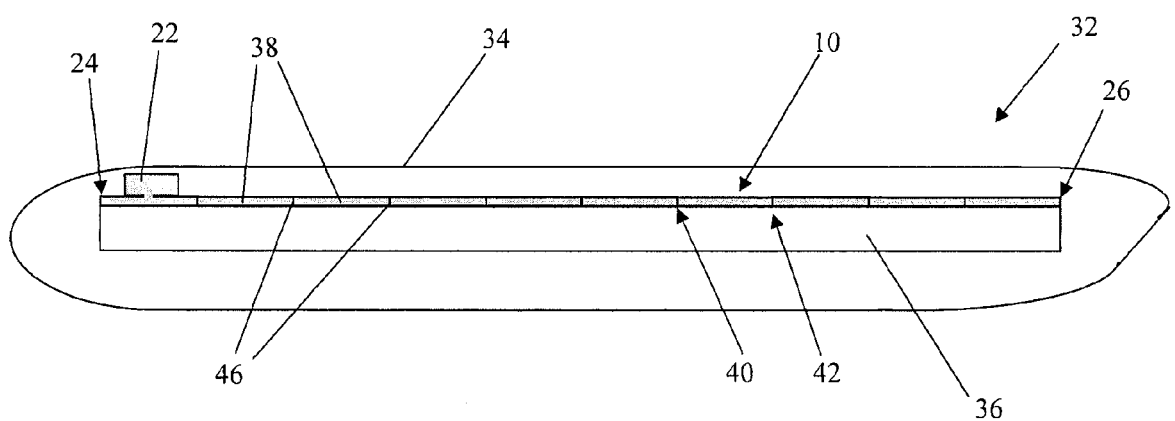
FIG. 5 is a side cross-sectional view of an aircraft of one embodiment of the present invention, with the wings and tail removed for clarity, showing an interior portion, a supply duct, and an air source.

The main compartment 12 has a generally constant cross-section along its length, i.e., the cross-sectional area of the main compartment is generally not tapered or stepped along its length, and is in fluid communication with a source 22 of gaseous fluid, shown in FIG. 5. While various sources may be employed, the source 22 of one embodiment is an airplane conditioned air pack and air recirculation system. The main compartment has a first end 24 and a second end 26 and defines a central axis 28 that runs between the two ends 24, 26. As shown in FIG. 5, the main compartment may run the majority of the length of an aircraft, but the main compartment may, instead, extend through a smaller portion of the aircraft in other embodiments.

The restrictor plates 20 extend from the inner wall 14 of the main compartment 12 in the direction of the central axis 28, as can best be seen in FIG. 4. The restrictor plates 20 typically extend downwardly from an upper section of the inner wall 14 as shown in FIG. 4, but the restrictor plates can extend inwardly from other portions of the inner wall so long as the restrictor plates partially restrict the flow of gaseous fluid therethrough. The restrictor plates 20 are configured, e.g., shaped, sized and/or spaced, to produce a flow rate 30 through the nozzle 16 at the first end 24 of the main compartment that is substantially the same as the flow rate 30 through the nozzle 16 at the second end 26 of the main compartment. This flow rate 30 is depicted in FIG. 3. By being substantially the same, the flow rates through the nozzle at the first and second ends need not be identical, but advantageously differ by no more than a predefined acceptable flow rate variation, such as 5% of the maximum flow rate through the nozzle. In some embodiments, the restrictor plates 20 are substantially the same size and are placed along the supply duct 10 at intervals such that the distance X between adjacent restrictor plates 20 is generally equal and may be between 20 and 30 inches. In other embodiments, however, the restrictors may have different sizes and/or shapes and the distance X between the restrictors may differ.

In some embodiments of the present invention, each nozzle 16 generally extends the length of the main compartment 12, forming an outlet 18 in the shape of one or more slots, as shown in FIG. 3. While the outlet 18 may be formed in various fashions, the embodiment of FIGS. 3 and 4 illustrates that the main compartment 12 includes a lengthwise extending nozzle trough 17 which is disposed within and partially blocks an otherwise open side of the main compartment 12. The outlet 18 is defined by those passageways that extend about the periphery of the nozzle trough 17 and remain open between the interior of the main compartment 12 and the external environment. While the nozzle trough 17 is depicted to have a truncated triangular shape in the embodiment of FIGS. 3 and 4, the nozzle trough 17 may have other configurations, if so desired.

The configuration of the restrictor plates 20 creates a substantially uniform flow rate 30 through the outlet 18 along the supply duct 10, illustrated in FIG. 3 by arrows of equal length. The restrictor plates 20 are configured to create a total pressure drop across each restrictor plate 20, for example from point A to point B in FIG. 3, that is equal to the rise in static pressure that would have resulted from point A to a point downstream, for example point C, had there been no restrictor plate in place, as in the prior art supply duct shown in FIGS. 1 and 2. In this way, the pressure drop across the restrictor plate 20 from point A to point B generally cancels out the rise in static pressure from point A to point C. Over a span of the main compartment that includes a plurality of restrictor plates 20, the total pressure drop across the restrictor plates 20 from the source 22 to a point in the main compartment 12 downstream of the source 22, such as point C, is substantially equal to the rise in static pressure from the source 22 to that point.

The restrictor plates 20 may be configured such that there is a predetermined variation in pressure within the main compartment 12. For example, computational models and experimental data have shown that the variation in pressure within the main compartment 12 may be limited to approximately 0.3 psf (pounds per square foot), considering air as the gaseous fluid.

The supply duct 10 may be connected to a second, adjacent supply duct 10' (not shown) at their corresponding ends 24, 26 to produce a longer supply duct and at the same time allow for ease of manufacture and assembly. Referring to FIG. 3, for example, the second end 26 of a supply duct 10 may be attached to the first end 24 of an adjacent supply duct 10', and the second end 26 of the adjacent supply duct 10' may be attached to the first end 24 of another adjacent supply duct 10", and so on until the desired duct length is achieved. Each section of the longer supply duct 10 may have one or more restrictor plates 20, with the restrictor plates 20 configured as previously discussed.

In some embodiments of the present invention, the source 22 of gaseous fluid may be located near one of the ends 24, 26 of the main compartment 12 of the supply duct 10, as shown in FIG. 5. In other embodiments, the source 22 may be located between the two ends 24, 26 such that the gaseous fluid flows from the source 22 into the main compartment 12 and from there flows towards each of the first and second ends 24, 26 of the main compartment 12.

As noted above, the supply duct 10 may be employed by an aircraft as shown in FIG. 5. The aircraft 32 of this embodiment comprises an aircraft body 34 and a supply duct 10 for supplying an interior portion 36 of the aircraft body 34, such as the passenger compartment, with air. The supply duct 10 includes a plurality of substantially similar duct sections 38, and each duct section 38 comprises a main compartment 12 with a generally constant cross-section, at least one nozzle 16, and at least one restrictor plate 20 attached to an inner wall 14 of the main compartment 12, as shown in FIGS. 3 and 4.

Again referring to FIG. 5, the main compartment 12 of each duct section is in fluid communication with an air source 22 which may be a common air source for the entire supply duct. The main compartment 12 has a first end 40 of the respective section and a second end 42 of the same section and defines a central axis 28 extending between the first and second ends 40, 42 of the respective section of the supply duct 10. Each nozzle 16 extends between the first and second ends 40, 42 of the main compartment 12 and defines an outlet 18 to allow air to flow from the main compartment 12 to the interior portion 36 of the aircraft body 34, as shown in FIG. 5. Each restrictor plate 20 extends from the inner wall 14 of the main compartment 12 in the direction of the central axis 28 of the main compartment 12, as shown in FIG. 4. The restrictor plates 20 within each duct section 38 and between duct sections 38 are generally equidistantly spaced and are configured such that the air flow rate 30 through the outlet 18 near the first end 40 of the main compartment 12 is substantially the same as the air flow rate 30 near the second end 42 of the main compartment 12.

As previously discussed, the one or more restrictor plates 20 within each duct section 38 are configured to generate a total pressure drop within each duct section 38 that is generally equal to the rise in static pressure along the duct section 38. Furthermore, the restrictor plates 20 may be configured to produce only a predetermined amount of pressure variation within each duct section 38, and consequently between duct sections 38. The restrictor plates may be spaced apart from each other by 20 to 30 inches.

For example, computational and experimental models have shown that for a standard duct diameter of 11 inches and a duct length of up to 60 feet, e.g., the duct length onboard a Boeing® 777 Freighter aircraft, the pressure variation within the supply duct 10 may be limited to approximately 1 psf when restrictor plates 20 having dimensions of 1.2 inches×6 inches are used and are spaced approximately 24 inches from adjacent restrictor plates 20 along the supply duct 10. For the aforementioned supply duct 10 and restrictor plate 20 dimensions, a distance X of 23 to 28 inches separating adjacent restrictor plates 20, shown in FIG. 3, has been found to produce substantially uniform flow rates 30 through the nozzles 16.

In some embodiments of the present invention, each restrictor plate 20 is attached to the inner wall 14 of the main compartment 12 with a connection 44. The connection 44 may consist of mechanical fasteners or adhesive, or both. Adjacent duct sections 38 may also include connections 46 between attached duct sections 38, such connections 46 comprising, for example, a bell and spigot connection.

The aircraft 32 of some embodiments may further comprise an air source 22 for providing air to the main compartment 12 of the supply duct 10. The air source 22 may be located near one end of the supply duct 10, as shown in FIG. 5, or the air source 22 may be located between the two ends 24, 26 of the supply duct 10, wherein the air would flow from the source 22 to each of the two ends 24, 26 of the supply duct 10.

Figure 6:
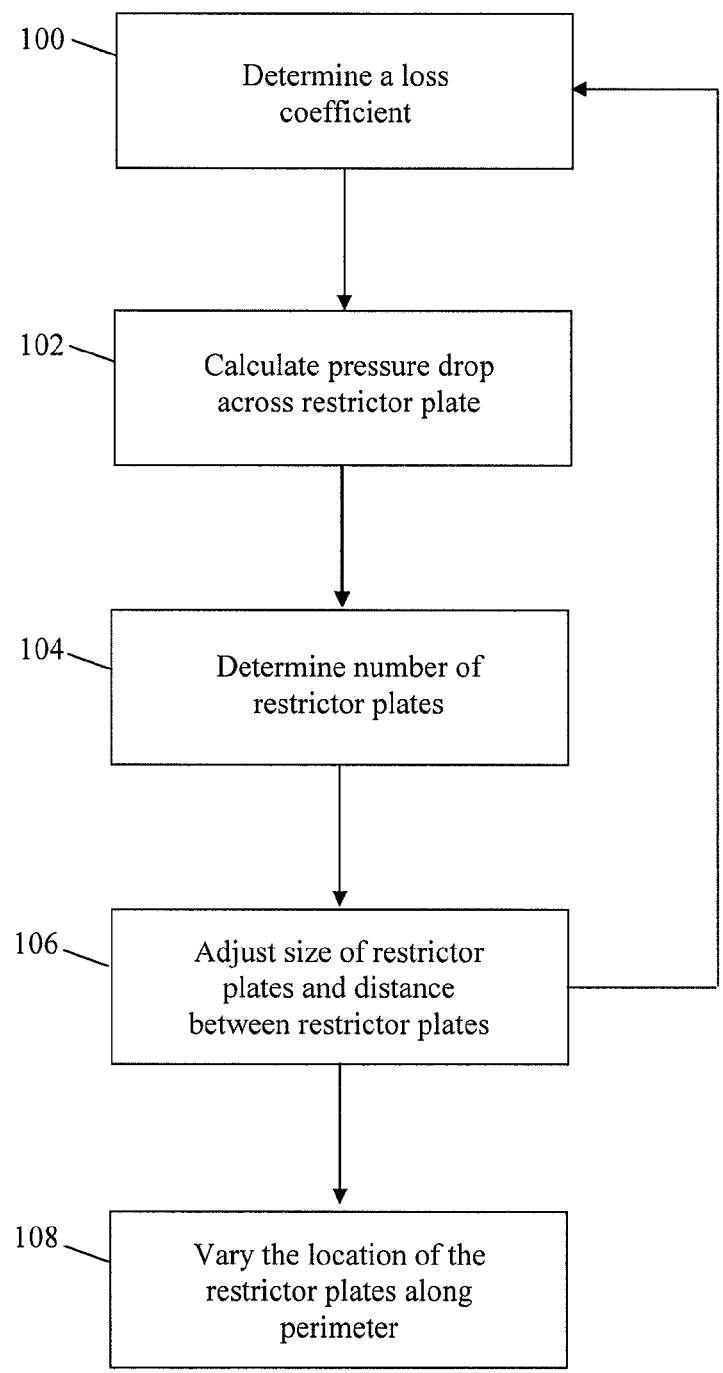
FIG. 6 is a flow chart showing one embodiment of the method of sizing restrictor plates associated with the present invention.

Other embodiments of the present invention are directed to a method of sizing restrictor plates 20. The method, illustrated in FIG. 6, comprises determining a loss coefficient similar to a flat plate drag coefficient for a predetermined size of the restrictor plate 20, calculating a pressure drop across the restrictor plate 20, and determining a number of restrictor plates 20 required to produce a total pressure drop substantially equal to the rise in static pressure in the supply duct 10. See blocks 100-104 of FIG. 6. The loss coefficient $C_1$ is determined by using the algorithm $C_1=(1-A_{eff}/A)^2$, where $A_{eff}$ is the effective area of the duct and A is the actual area of the duct. The pressure drop $\Delta p$ is calculated using the equation $\Delta p=C_1\rho(Q/A_{eff})^2/2$, where $\rho$ is the density of air and Q is the volume rate of flow of air. The number of restrictor plates is determined by dividing the length of the supply duct by the optimum spacing between restrictor plates 20, for example a spacing of 24 inches.

The method may further comprise adjusting the predetermined size of the restrictor plates 20 such that the resulting flow rate 30 out of the supply duct 10 is generally uniform along the supply duct 10. See block 106 of FIG. 6. The size of the restrictor plates 20 may be determined by the effective area $A_{eff}$ used in the pressure drop $\Delta p$ calculation above, iterated from the $\Delta p$ or determined through laboratory experimentation or computational fluid dynamics. The adjusted size of the restrictor plates 20 may be used in the previously described steps, corresponding to blocks 100-104 of FIG. 6 to further equalize the total pressure drop and the rise in static pressure in the supply duct 10.

The method may also comprise adjusting the location of the restrictor plate 20 about the central axis 28 of the main compartment 12, maintaining the same spacing between adjacent restrictor plates 20, in order to create a predetermined amount of pressure variation within the supply duct 10. See block 108 of FIG. 6. For example, FIG. 4 shows a restrictor plate 20 centrally located on the inner wall 14 of the main compartment 12 directly opposite the nozzles 16. This location has been found to reduce the amount of pressure variation within the supply duct 10 to levels similar to those previously described. However, other locations of the restrictor plate 20 do not depart from the scope of this invention.

The method of some embodiments may further comprise distributing the restrictor plates 20 along the supply duct 10 such that adjacent restrictor plates 20 are equidistant from each other. See block 104 of FIG. 6. Equidistantly spaced restrictor plates 20 have been found to produce more uniform air flow and allow for greater ease in the manufacture and assembly of the supply duct 10.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A duct for supplying a gaseous fluid comprising:
a main compartment with a generally constant cross-section in fluid communication with a source, the main compartment defining an inner wall and having a first end and a second end defining a central axis therebetween, wherein the gaseous fluid flows in a direction generally aligned with the central axis defining a flow path;
at least one nozzle disposed in the main compartment, each nozzle defining an outlet generally extending the length of the main compartment and configured to allow a gaseous fluid to flow out from the main compartment; and
a plurality of solid restrictors consisting of plates extending into the flow path from a portion of the inner wall of the main compartment that is opposite from the at least one nozzle towards the central axis of the main compartment and generally perpendicularly to the flow path, wherein each restrictor is configured to produce a flow rate through the nozzle at the first end of the main compartment that is substantially equal to the flow rate through the nozzle at the second end of the main compartment, wherein the restrictors are substantially the same size and are generally equidistantly spaced along the main compartment.

2. The duct of claim 1 wherein the restrictors are configured such that the flow rate through the outlet is substantially the same along the length of the at least one nozzle.

3. The duct of claim 1 wherein the restrictors are configured to create a total pressure drop across the restrictors from the source to an endpoint in the main compartment downstream of the source that is substantially equal to the rise in static pressure from the source to the endpoint.

4. The duct of claim 1 wherein the restrictors are configured to allow a predetermined amount of pressure variation within the main compartment.

5. The duct of claim 1 wherein at least one of the first and second ends of the main compartment is attached to one of the first and second ends of the main compartment of an adjacent duct to form a longer duct.

6. The duct of claim 1 wherein the first end of the main compartment is proximate the source.

7. The duct of claim 1 wherein the source is located between the first end and the second end of the main compartment, and gaseous fluid flows from the source to each of the first and second ends of the main compartment.

8. An aircraft comprising:
an aircraft body; and
a supply duct for supplying air to an interior portion of the aircraft body, the supply duct having a first end and a second end and having a plurality of substantially similar duct sections therebetween, each duct section comprising:
a main compartment with a generally constant cross-section in fluid communication with an air source, the main compartment defining an inner wall and having a first end and a second end defining a central axis, wherein the air flows in a direction generally aligned with the central axis defining a flow path;
at least one nozzle extending between the first end and the second end of the main compartment, each nozzle defining an outlet generally extending the length of the main compartment and configured to allow air to flow from the main compartment to the interior portion of the aircraft body; and
a plurality of solid restrictor plates extending into the flow path from a portion of the inner wall of the main compartment that is opposite from the at least one nozzle towards the central axis of the main compartment and generally perpendicularly to the flow path;
wherein the restrictor plates are substantially identical, generally equidistantly spaced, along the length of the main compartment and configured such that the air flow rate through the outlet proximate the first end of the supply duct is substantially equal to the air flow rate through the outlet proximate the second end of the supply duct.

9. The aircraft of claim 8 wherein the restrictor plates are configured to generate a total pressure drop in each duct section that is generally equal to the rise in static pressure along the duct section.

10. The aircraft of claim 8 wherein the restrictor plates are configured to allow a predetermined amount of pressure variation within each duct section and between duct sections.

11. The aircraft of claim 8 wherein the restrictor plates are spaced apart from each other by 20 to 30 inches.

12. The aircraft of claim 8 further comprising a connection between the inner wall of the main compartment and each restrictor plate, the connection selected from the group consisting of mechanical fasteners and adhesive.

13. The aircraft of claim 8 further comprising a connection between at least one end of the main compartment and one of the ends of the main compartment of an adjacent duct section, the connection comprising a bell and spigot connection.

14. The aircraft of claim 8 further comprising an air source located proximate one of the first end and the second end of the supply duct.

15. The aircraft of claim 8 further comprising an air source located between the first end and the second end of the supply duct and flowing air from the air source to each of the first and second ends of the supply duct.

16. A method of sizing restrictor plates for placement in a supply duct, wherein the supply duct comprises a main compartment with a generally constant cross-section in fluid communication with a source, the main compartment defining an inner wall and having a first end and a second end defining a central axis therebetween, wherein the gaseous fluid flows in a direction generally aligned with the central axis defining a flow path, and wherein the duct further comprises at least one nozzle disposed in the main compartment, each nozzle defining an outlet generally extending the length of the main compartment and configured to allow a gaseous fluid to flow out from the main compartment, the method comprising:
determining a loss coefficient for a predetermined size of the restrictor plate;
calculating a pressure drop across the restrictor plate using the determined loss coefficient;
determining a number of restrictor plates required to produce a total pressure drop between the first and second ends of the main compartment of the supply duct that is substantially equal to the rise in static pressure that would have resulted between the first and second ends had there been no restrictor plates in place, wherein the restrictor plates are substantially the same size; and
adjusting the predetermined size of the restrictor plates and the distance between adjacent restrictor plates along the supply duct to produce a flow rate out of the supply duct that is generally constant per unit length of the supply duct, wherein the determined number of restrictor plates are placed in the supply duct such that they are generally equidistantly spaced along the main compartment and extend into the flow path from a portion of the inner wall of the main compartment that is opposite from the at least one nozzle towards the central axis of the main compartment and generally perpendicularly to the flow path.

17. The method of claim 16 further comprising varying the location of at least one of the restrictor plates about the central axis of the main compartment along a perimeter of a cross-section of the supply duct to create a predetermined amount of pressure variation within the supply duct.

18. The method of claim 16 further comprising distributing the restrictor plates along the supply duct such that the distance between adjacent restrictor plates is substantially the same.

* * * * *